Figure 1:
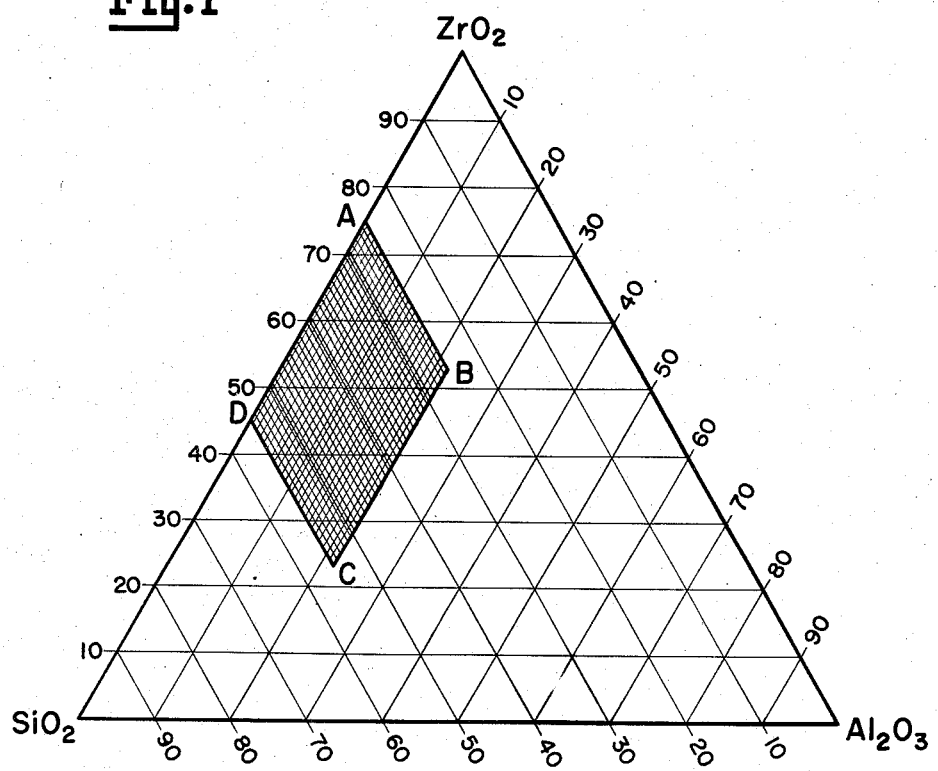

Feb. 9, 1960

J. C. McMULLEN 2,924,533

SPHEROIDAL REFRACTORY MATERIAL AND METHOD OF MAKING

Filed May 28, 1956

2 Sheets-Sheet 1

INVENTOR.
JOHN C. McMULLEN
BY
ATTORNEY

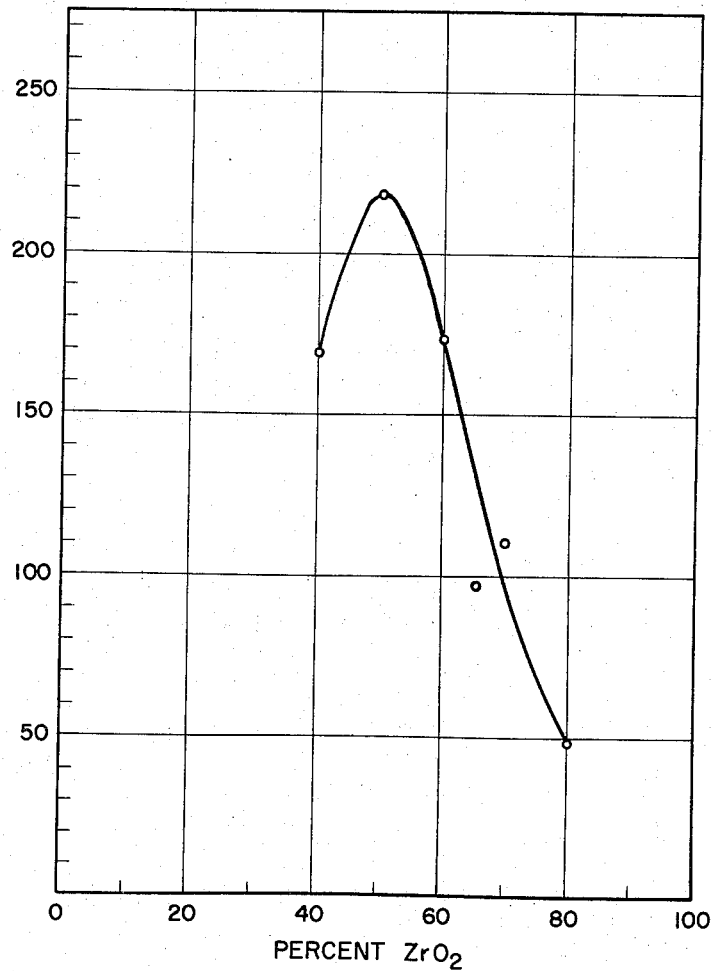

2,924,533
SPHEROIDAL REFRACTORY MATERIAL AND METHOD OF MAKING

John C. McMullen, Niagara Falls, N.Y., assignor to The Carborundum Company, Niagara Falls, N.Y., a corporation of Delaware Application May 28, 1956, Serial No. 587,762

5 Claims. (Cl. 106—57)

This invention relates to a refractory product in the form of small, fused spheroidal particles or pellets characterized by an unusually high mechanical strength and a substantially solid or non-porous structure. More specifically, the spheroidal particles of the present invention are composed of finely crystalline zirconia, with or without alumina or mullite crystals, embedded in a highly siliceous glassy matrix. The product is adapted for use, inter alia, as blasting media or as an heat exchange material. Spherical pellets are desired in many blasting operations because of the "peening" effect they produce in contrast to the pitting action of sharp, irregular granular material.

Heretofore prior to the present invention, iron shot have been used as a blasting media but have been unsatisfactory due to the development of rust spots on the surface of the object being blasted. Consequently, rock wool pellets which are a byproduct in the manufacture of rock wool have been used as a blasting media with satisfactory results although such pellets are relatively weak and have an inordinately short life as a blasting material. Fused mullite pellets have also been used for the same purpose but are similarly subject to early failure because of breakdown under ordinary conditions of use.

It is an object of the present invention to provide an improved refractory pellet material of high mechanical strength suitable for use as a blasting media.

It is a further object to provide a refractory pellet material suitable for use as a heat exchange material.

The present invention provides an inorganic nonmetallic refractory material in the form of small, fused spheroidal particles or pellets of substantially solid structure throughout, which are of unusually high mechanical strength. The spheroidal pellets of the present invention are obtained by fusing the raw materials from which it is desired to make the spheroidal particles, using preferably a furnace of the type well known in the manufacture of fused alumina. The material is melted in such a furnace and the molten material caused to flow from the furnace in a thin stream. This effluent stream of molten material flows past one or more high pressure air or other gaseous jets directed at approximately right angles to the stream. The air jet breaks the molten stream into droplets and carries these droplets through the air for several feet before dropping them. The droplets solidify before striking and have a roughly spherical or spheroidal shape. In fact, contrary to all previous experiences, when the material as blown is cooled suddenly by water quenching the product tends to be stronger and tougher than when the material is air-cooled.

The product of the present invention comprises small, fused spheroidal particles consisting essentially of crystalline zirconia, with or without crystalline mullite, embedded in a siliceous glassy matrix. Most satisfactory results with respect to high mechanical strength are obtained when the crystalline zirconia content of the particles ranges from about 45% to 75% by weight of the particle. When alumina is present combined with silica in the form of mullite crystals, the alumina should preferably amount to no more than about 22% by weight of the pellet, by oxide analysis. When the silica content of the material exceeds 55%, and especialy when it is over 60% by weight, the material tends to form fibers instead of pellets when it is subjected in molten form to the air or other gaseous blast.

Figure 2:
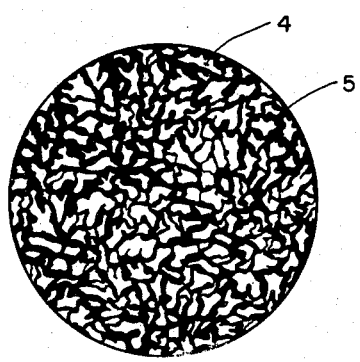

Figure 1 of the drawing is a triaxial diagram showing the range of compositions of zirconia, alumina and silica from which spheroidal particles of improved high mechanical strength can be made;

Figure 2 of the drawing is a highly enlarged, schematic sectional view, through a fused spheroidal particle made according to the present invention; and Figure 3 is a graph showing the mechanical strength of zirconia-silica pellets of several different proportions of zirconia and silica.

Refractory pellets of substantially solid, generally spheroidal shape of unusually high mechanical strength and extremely resistant to breakdown in air blasting operations have been made as follows:

A raw batch consisting of 75 parts zircon and 25 parts of silica sand is fused in an electrical pot furnace of the type conventionally used for the making of fused alumina abrasive material. The zircon analyzes about 67% zirconia and 33% silica and the silica sand is over 99% silica so that the raw batch amounts to roughly equal parts by weight of zirconia and silica by oxide analysis. The molten material is released from the furnace in the form of a small stream of molten material which is directed in front of one or more high pressure air or gaseous jets directed at approximately right angles to the stream of material. The air jet breaks the molten stream into droplets and carries these droplets through the air for several feet to suddenly cool them before they are dropped. The droplets solidify before striking and have a roughly spheroidal shape. The individual particle size of the spheroidal material depends largely upon the air pressure used for dissipating the stream of molten material. Table I below shows the effect of various nozzle pressures upon the particle size distribution of the resulting product. Higher nozzle air or gas pressures result in an increase in the percentage of finer size spheroidal particles.

TABLE I

*Effect of nozzle pressure on particle size distribution*

| Particle Size (U.S. Standard Sieve) of spheroidal pellets | Air Pressure in Pounds Per Square Inch | | | |
|---|---|---|---|---|
| | 10 p.s.i. | 20 p.s.i. | 40 p.s.i. | 55 p.s.i. |
| | Percent | Percent | Percent | Percent |
| +8 mesh | 5.2 | 4.7 | 2.9 | 1.5 |
| −8+20 mesh | 41.2 | 30.3 | 19.9 | 18.4 |
| −20+50 mesh | 43.7 | 51.1 | 55.8 | 51.8 |
| −50+100 mesh | 8.1 | 10.7 | 13.3 | 16.4 |
| −100 mesh | 1.8 | 3.2 | 8.1 | 11.9 |

Referring further to Figure 2 of the drawing, petrographic examination of the resulting pelleted product discloses that the pellets consist essentially of fine crystals 4 of zirconia having a maximum length of around 2 microns embedded in a glassy or vitreous siliceous matrix 5. The resulting pellets were tested for refractoriness, mechanical or crushing strength, and resistance to breakdown in blasting operations in direct comparison with mullite and two different types of rock wool pellets and were found to be remarkably superior in both mechanical or crushing strength and resistance to breakdown to either the mullite or rock wool pellets heretofore used as a blasting media.

The pellets were tested for refractoriness as follows: small porcelain crucibles, filled with graded pellets 28 to 38 particle size (U.S. standard sieve), were heated to 1400° C. and held for 5 hours at that temperature in an electrically heated kiln. The pellets were considered to have satisfactorily passed the test for refractoriness if they did not sinter together. With the exception of the rock wool pellets, which melted, none of the other compositions sintered together and were considered to be acceptable from the standpoint of refractoriness.

The mechanical strength of the pellets was obtained by determining the crushing strength using two different sizes of pellets with results as shown in Table II below. The pellets were classified by passing over a Wilfley table so that only perfect spheres would be used for the test. Twenty-five pellets of each material were crushed and the results averaged for each determination. In addition to determining the strength of the zirconia-silica pellets made as described above from 75 parts of zircon and 25 parts of silica sand, crushing strengths were obtained for mullite pellets and two types of rock wool pellets for purposes of comparison. It should be observed that the zirconia-silica pellets were from 4 to 6 times stronger than the mullite or rock wool pellets.

TABLE II

| Pellet Composition | Pounds Required to Crush (Average for 25 Pellets) | |
|---|---|---|
| | 10-12 Grit Size | 32-36 Grit Size |
| | (U.S. Standard Sieve) | |
| 50 ZrO₂—50 SiO₂ | 218.5 | 50.8 |
| Mullite | 37.6 | 8.6 |
| Rock Wool No. 1 | 34.5 | 10.5 |
| Rock Wool No. 2 | 46.1 | 12.5 |

The rock wool pellets used for the above test had the following analyses:

| | Rock Wool No. 1 | Rock Wool No. 2 |
|---|---|---|
| | Percent | Percent |
| SiO₂ | 37.94 | 37.55 |
| Al₂O₃ | 10.50 | 11.60 |
| CaO | 41.80 | 35.38 |
| MgO | 7.34 | 4.36 |
| Fe₂O₃ | 1.25 | 9.03 |
| TiO₂ | 0.53 | 0.36 |
| Na₂O | 0.91 | 1.22 |
| | 100.27 | 99.56 |

The pellets were also tested for resistance to breakdown by air blasting as follows. A 25 gram sample of each pelleted material consisting of tabled spheroidal particles having a particle size of 28/38 U.S. standard sieve were blasted at 60 pounds air pressure against a hardened steel plate having a Rockwell hardness of 62. After blasting, the pellets were collected and again passed over a Wilfley table to separate the remaining spheroidal particles from the imperfect spheres and dust resulting from fracturing of the original material. The percentage loss was calculated on the weight of the dust and imperfect spheres removed by tabling, with the following results:

TABLE III

Blast test results 28/38 particle size pellets

| Pellet Composition | Percent Loss in Weight |
|---|---|
| 50% ZrO₂—50% SiO₂ | 10.8 |
| Mullite | 83.6 |
| Rock Wool No. 1 | 98.8 |
| Rock Wool No. 2 | 97.2 |

It is to be observed that the zirconia silica pellets suffered only a 10.8% loss in weight due to breakdown during the air blasting whereas by comparison the fused mullite particles suffered a loss of 83.6% by weight due to fracture and breakdown of the material and the rock wool pellets underwent a 97.2 to 98.8% loss due to breakdown.

It has been further found that it is essential that the spheroidal particles be suddenly cooled in order to obtain the optimum strength. While cooling of the particles upon formation can be accomplished by air blasting of the molten material followed by sudden air cooling, the strength of the pellets can be increased substantially by sudden cooling of the pellets by water quenching immediately upon the formation of the molten material into solidified droplets.

The proportions of zirconia and silica in the spheroidal particles can be varied considerably from the roughly 50-50 proportions set forth in the example above with spheroidal material of satisfactory properties being obtained. For example, Table IV below sets forth several additional examples of zirconia-silica compositions having different proportions of zirconia and silica content with or without alumina together with the crushing strength and resistance to breakdown under air blasting being shown for each material. Figure 3 presents in graph form the crushing strength data on 10 to 12 particle size material for Examples 1 through 6 of Table IV.

TABLE IV

| Example No. | Composition, parts by weight | | | Blasting Test, On 28/38 particle size, Percent Loss in Weight | Crushing Strength, Pounds to crush 10/12 particle size |
|---|---|---|---|---|---|
| | ZrO₂ | SiO₂ | Al₂O₃ | | |
| 2 | 80 | 20 | | 54.4 | 48.3 |
| 3 | 70 | 30 | | 42.8 | 110.7 |
| 4 | 65.2 | 33.8 | | 42.4 | 97.5 |
| 5 | 60 | 40 | | 20.8 | 173.6 |
| 1 | 50 | 50 | | 10.8 | 218.5 |
| 6 | 40 | 60 | | 24.8 | 168.8 |
| 7 | 16 | 36 | 45 | 34.0 | 209.2 |
| 8 | 49 | 35 | 15 | 20.0 | 136.8 |

Examples 7 and 8 of Table IV above are representative of a fused spheroidal material made according to the present invention in which substantial amounts of alumina are present in the material. Examples 7 and 8 were made from fusions of zircon and kyanite and it is to be observed that despite the presence of substantial amounts of alumina combined with silica in the form of mullite crystals in the pelleted material the pellets are of acceptable high strength and are resistant to breakdown under air blasting conditions. In fact, it would appear that Example 7 is exceptionally superior because of its very high crushing strength. However this composition has the disadvantage that in forming the pelleted material, the pellets are contaminated with a substantial amount of unsatisfactory fibrous material which is formed simultaneously with the pellets during the pelleting operation so that the yield of material in pellet form is much lower than is obtained in the case of the other mixes set forth in Table IV and furthermore involves the cost of separating the fibrous material from the pellets. It is also noted that in the case of Example 6 where the silica content is 60% that the material tends to form fibers simultaneously with the formation of pellets so that this renders these particular mixes somewhat disadvantageous from the standpoint of ease of manufacture of a clean, uncontaminated pellet material in substantial yield.

Figure 1 shows the area of compositions of alumina and silica, with or without zirconia, from which satisfactory refractory spheroidal particles or pellets of acceptably high crushing strength and resistance to breakdown can be made in high yield with little or no fiber formation. The shaded area embracing these compositions is defined by lines connecting points A, B, C and D, wherein the points A, B, C and D represent the following compositions by weight.

|  | A | B | C | D |
|---|---|---|---|---|
| Zirconia_____percent__ | 75 | 52.5 | 22.5 | 45 |
| Silica_____do____ | 25 | 25 | 55 | 55 |
| Alumina_____do____ |  | 22.5 | 22.5 |  |

Having described the invention it is desired to claim:

1. Fused spheroidal particles consisting essentially of 45 to 75 parts by weight zirconia and 55 to 25 parts by weight silica.

2. Fused spheroidal particles consisting essentially of approximately equal parts by weight of zirconia and silica.

3. A fused zirconia-based spheroidal particle consisting essentially of from 22½% to 75% by weight of zirconia crystals embedded in a glassy siliceous matrix, said particle being mechanically strong and substantially non-porous in character.

4. A fused spheroidal particle consisting essentially of zirconia, alumina and silica in the proportions by weight embraced by the shaded area defined by lines connecting points A, B, C and D of Figure 1 of the drawing.

5. Fused spheroidal particles of 8 mesh size and finer consisting essentially of zirconia, alumina and silica in the proportions by weight of 22.5% to 75% zirconia, 25% to 55% silica and 0 to 22.5% alumina, said particles being individually substantially solid throughout and mechanically strong.

References Cited in the file of this patent

UNITED STATES PATENTS

| 1,440,657 | Buckman _____ | Jan. 2, 1923 |
| 1,615,751 | Fulcher _____ | Jan. 25, 1927 |
| 1,894,208 | Von Girsewald et al. ____ | Jan. 10, 1933 |
| 2,271,366 | Field _____ | Jan. 27, 1942 |
| 2,271,369 | Fulcher et al. _____ | Jan. 27, 1942 |
| 2,409,844 | Field _____ | Oct. 22, 1946 |
| 2,633,623 | Robinson _____ | Apr. 7, 1953 |
| 2,676,359 | Chisholm _____ | Apr. 27, 1954 |
| 2,684,912 | Dreher _____ | July 27, 1954 |
| 2,695,242 | Woodward _____ | Nov. 23, 1954 |

UNITED STATES PATENT OFFICE
CERTIFICATE OF CORRECTION

Patent No. 2,924,533                            February 9, 1960

John C. McMullen

It is hereby certified that error appears in the above numbered patent requiring correction and that the said Letters Patent should read as corrected below.

Column 4, line 69, for "alumina" read -- zirconia --; line 70, for "zirconia" read -- alumina --.

Signed and sealed this 23rd day of October 1962.

(SEAL)
Attest:

ERNEST W. SWIDER
Attesting Officer

DAVID L. LADD
Commissioner of Patents